United States Patent Office 3,300,129
Patented Jan. 24, 1967

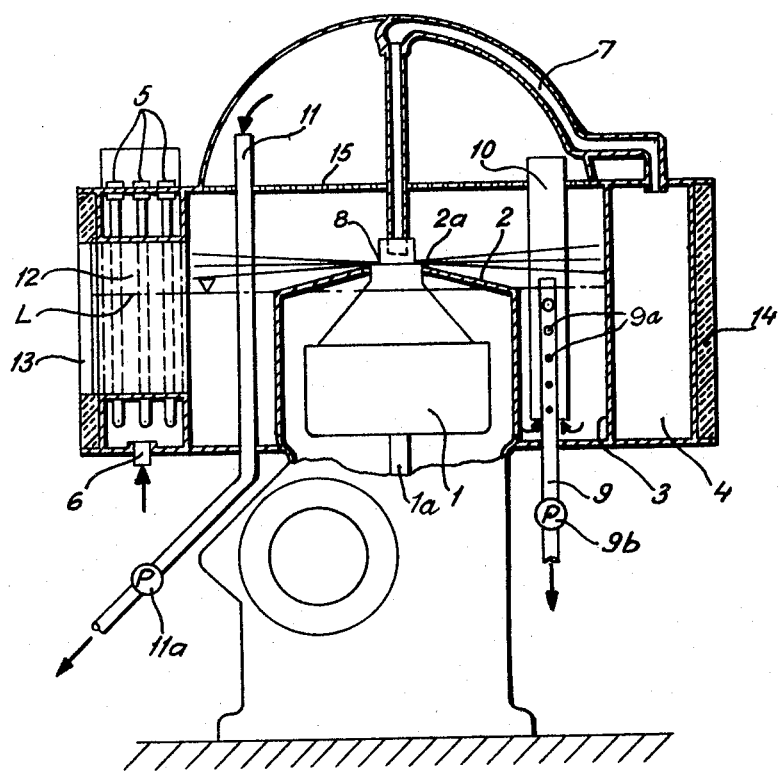

3,300,129
CENTRIFUGAL SEPARATOR OF VACUUM TYPE
Enrico Brunati, Milan, Italy, assignor to Aktiebolaget
Separator, Stockholm, Sweden, a corporation of Sweden
Filed Jan. 20, 1964, Ser. No. 338,973
Claims priority, application Sweden, Jan. 21, 1963,
624/63
7 Claims. (Cl. 233—1)

The present invention relates to apparatus for separating substances from a liquid, which substances are more volatile than the liquid.

By way of example, spent transformer oil usually contains dissolved moisture and air and often contains even free water and solid impurities in suspension, whereby its insulating and cooling properties are considerably impaired. Water and solid particles can easily be removed by centrifugation or filtration but even the moisture and the air dissolved in the oil must be removed in order that the oil can fulfill its function satisfactorily. This removal is effected by heating the oil to a temperature at which the water boils and, in order to avoid detrimental over-heating of the oil, the hot oil is usually supplied into a vacuum chamber where the water evaporates at a comparatively low temperature which is harmless for the oil. A rapid evaporation is obtained by dispersion or pulverization of the oil in vacuum, as by means of grooves or jet nozzles in the vacuum chamber.

An extreme pulverization (surface increase) of the oil is obtained by means of a centrifuge rotor from which the oil is thrown out into the collecting housing of the centrifuge in the form of mist. This, in fact, has been used for drying and deaeration of transformer oil by subjecting the collecting housing of the centrifuge to vacuum. In the centrifuge, the oil is thus relieved from the suspended solid impurities and water, which are retained in the centrifuge rotor, and is also relieved from dissolved moisture and air which are evaporated in the collecting housing under vacuum.

It has been found, however, that this evaporation in the centrifuge is insufficient owing to the fact that the space in the collecting housing is so limited that the ejected fine oil drops come into contact with the wall of the collecting housing before oil, moisture and air have had time to evaporate and that the oil, on the whole, is subjected to vacuum only during a very short time. Furthermore, the moisture condenses on the inside of the wall and is remixed with the oil. The centrifuged and partly dried and deaerated oil is therefore usually conveyed from the collecting chamber to a vacuum container having such dimensions that the oil surface and the retention time are sufficient for an effective evaporation of the remaining moisture and air. The walls of the vacuum container are usually heat-insulated in order to reduce expensive heat radiation losses and detrimental steam condensation. However, even this expedient does not prevent some of the steam evaporated in the vacuum container from condensing on the inner wall surfaces of the container, from which it is pumped.

A plant for such purification and drying of transformer oil thus comprises generally a through-flow heater, a vacuum centrifuge with a collecting housing, a vacuum container, a vacuum pump, and separate oil pumps connected by the required pipes. Such a plant has the following drawbacks:

(1) Large heat radiation surfaces are present from the oil heater to and inclusive the vacuum tank, which means a partial condensing of the steam separated in the centrifuge and the vacuum tank as well as heat losses and temperature drop during the course of the process. This drawback is particularly serious when the plant operates outdoors in wintertime, in open transformer substations, which is often the case.

(2) Difficulties are encountered in avoiding air leakage in all pipe lines and connections in the vacuum system and thereby impairment of the vacuum and the efficiency of the plant as well as the risk of oxidation of the oil due to penetration of air into the system.

(3) The plant becomes comparatively bulky and heavy, which is a serious drawback because an easily transportable plant is usually desired.

The present invention relates to an apparatus which eliminates all the above-noted drawbacks and which, unlike previous apparatus of this type, is characterized by an efficient purification and drying of transformer oil, for example, without condensation and remixing of water in the oil and with good heat economy, negligible risk for air leakage as well as small space requirements and weight.

In an apparatus made according to the invention, the collecting housing has an outer wall provided with a heating device so as to prevent condensation of steam into water, for example, and remixing of the water with the oil.

According to another feature of the invention, the outer wall of the collecting housing is located at a greater distance from the shaft of the centrifuge rotor than is usually the case in centrifuges of this kind, whereby the path of the liquid from the ejection opening in the centrifuge to the wall is longer and the time during which the vacuum can operate on the pulverized liquid is longer, which is of advantage for the evaporation of the more volatile phase and the removal of the latter.

According to a further feature, the collecting housing is relatively large in the axial direction and surrounds the whole centrifuge, whereby the collecting housing serves as a vacuum container and thus eliminates the need for a special vacuum container.

An additional feature resides in the arrangement of a special chamber around the collecting vessel, whereby the design is compact and small in bulk. By providing this chamber with a heating device, a special heating device for the outer wall of the collecting housing is not required. When the liquid to be heated is first heated in the chamber and thereafter conveyed to the inlet of the centrifuge, that part of the liquid heat which would otherwise be lost through the chamber wall can be recovered in order to maintain the outer wall of the collecting vessel warm. The outer wall of the chamber as well as the remaining parts of the casing surrounding the centrifuge are provided with a heat-insulating outer coating to prevent heat losses.

Due to the compact design of the new apparatus, the heat losses to the surroundings are reduced to a minimum and the number of pipes and connections is relatively small, thereby reducing the risk of air leaking into the liquid. Other characteristics of the invention, the advantages to be derived thereof as well as the operation of the apparatus, appear from the following description, reference being made to the attached drawing in which the single illustration is a schematic side elevational view, partly in axial section, of a preferred embodiment of the invention.

A centrifuge rotor 1 is arranged in an inner housing 2 where the rotor is supported and driven by a vertical shaft 1a, as is conventional in the art. Housing 2 is surrounded by a collecting housing 3 for the processed liquid, this collecting housing being maintained under partial vacuum by means to be described presently. Only the uppermost, diametrally smallest part of the centrifuge rotor 1, where its inlet and outlet are located, extends upward through a circular opening 2a located at the center of the slightly conical top of the inner housing 2. The collecting housing 3 is in turn surrounded by a closed, annular chamber 4 to which heat can be supplied by means of a heating device 5 arranged in the chamber. This heating device preferably consists of a series of electric heating elements distributed around the outer chamber 4.

The chamber 4 is provided with a bottom inlet 6 for the liquid to be processed and communicates through a pipe 7 with the inlet of the centrifuge rotor 1 at its top. The centrifuge rotor is provided with an outlet 8 arranged radially outside the inlet and immediately above the inner housing 2, through which outlet 8 the separated liquid is ejected in the form of fine drops. The rotor can also be provided, if desired, with a conventional device (not shown) for continuously paring off the undissolved water centrifugally separated from the oil in rotor 1. The upper parts of the housings 2 and 3 are removable so that the rotor 1 is accessible from above.

In order to allow the withdrawal of processed liquid from the collecting housing 3, this housing is provided with a vertical pipe 9 extending into the collecting housing through its bottom and firmly secured thereto. Pipe 9 is open at its top and provided with vertically spaced holes 9a, the diameter of holes 9a decreasing toward the bottom of the collecting housing. The lower end of the pipe 9, outside the collecting housing, is connected to a suction pump 9b adapted to exhaust the processed liquid from the collecting housing in spite of the vacuum prevailing in that housing. Due to the location and the dimensioning of the holes 9a, the pipe 9 acts as a level controller for the liquid in the collecting housing. That is, at a higher liquid level, hole 9a which are more numerous and larger will form the through-flow area from the collecting housing into the pipe 9 while, at a lower liquid level, the corresponding through-flow area will be constituted by fewer and smaller holes. The size and the location of the holes is adjusted so that the liquid level is automatically maintained between the lower and the higher limit for the retention time of the liquid in the collecting housing, without any risk of liquid or foam flowing into the housing 2. The edge of the upper, open end of the pipe 9 is located somewhat lower than the central opening 2a at the top of the inner housing 2. Thus, if the total through-flow area of the holes 9a in the pipe 9 for some reason becomes insufficient so that the liquid level rises up to the upper edge of the pipe 9, the liquid will flow over that edge into the pipe 9 and be exhausted therefrom so that the liquid is prevented from entering the inner housing 2 through the central opening 2a.

The pipe 9 is surrounded by a pipe 10 open at both ends, the inner diameter of pipe 10 being larger than the outer diameter of the pipe 9. The pipe 10 extends from the vicinity of the bottom of the collecting housing 3 up to its top. The pipe 10 acts as a liquid seal and prevents foam (which is formed in the collecting housing 3 and which usually contains considerable quantities of moisture and air) from being sucked into the pipe 9 together with the final processed liquid and being mixed with it, which, of course, would impair the result of the processing to some extent. The liquid is sucked into the interspace between the pipe 9 and the pipe 10 from the vicinity of the bottom of the collecting housing 3, as indicated on the drawing by arrows.

In order to maintain a vacuum in housing 3 in an easy, practical way, this housing is provided with a vertical suction pipe 11 extending into the collecting housing through its bottom and firmly secured thereto. Pipe 11 extends from the bottom of the collecting housing to its upper part to such a height that there is no risk of foam being sucked into the vacuum pump 11a to which pipe 11 leads.

The closed, annular chamber 4 is provided, at least at one point of its periphery, with a channel 12 running through the chamber 4 and entirely delimited from this chamber. At its inner end, channel 12 communicates with the collecting housing 3. The outer end of channel 12 is tightly sealed by a transparent glass pane 13. The purpose of this channel 12 is to permit observation, through the glass pane 13, of the liquid level and, to a certain extent, of the formation of foam in the collecting housing. The maximum liquid level at which the apparatus operates satisfactorily is indicated on the drawing by the liquid level line L.

Due to the compactness of the new apparatus, the heat radiation areas are considerably reduced in relation to prior apparatus of this type. Nevertheless, it is preferable to provide the outer wall of chamber 4 with a covering of heat insulation 14.

To avoid the possibility of foam rising to the upper part of the separator and being sucked into the pipes 10 and 11 through their open upper ends, a perforated plate or strainer 15 may be arranged over the entire chamber formed by collecting housing 3, the upper ends of the pipes 10 and 11 being located above the strainer 15 as shown.

The centrifuge rotor 1 can be placed at such a height in the collecting housing 3 that the whole rotor is located above the highest possible liquid level in the collecting housing during operation.

When processing transformer oil, for example, the oil is fed under pressure, as by pumping or by gravity, through the inlet 6 into the chamber 4 where it is heated to the required temperature by means of the heating device 5 (preferably constituted by electrical heating elements arranged in and evenly distributed around the entire chamber 4, except at the space occupied by the channel 12). From the chamber 4, the heated oil is forced through pipe 7 into the centrifuge rotor 1 from above. Solid impurities and undissolved water dispersed in the oil are separated therefrom centrifugally in the rotor 1, as will be readily understood by those skilled in the art.

Since the content of dispersed and consequently separable water in spent transformer oil is usually very small, the apparatus of the invention can process considerable oil quantities before the separated water must be discharged from the rotor, as by the above-mentioned paring device or by stopping and emptying the rotor. The separated oil is ejected at high velocity through the discharge outlet 8 of the centrifuge rotor in the form of very small drops, so that the surface of the oil per unit of volume is very large. The oil drops hit the vertical, heated wall of the collecting housing 3 and are shattered against this wall, which is heated from the chamber 4, and the oil runs in a thin layer along this wall toward the bottom of the collecting housing 3 where a large, annular oil surface is formed. Due to the high temperature and the vacuum prevailing in the collecting housing 3, and to the large free oil surface, the oil is practically entirely relieved from dissolved moisture and air. Since the inner wall of the chamber 4 is maintained well heated, no steam can condense on this wall and therefore any "pollution" of the finally processed oil with condensate is impossible. All steam and air removed from the oil is exhausted through the pipe 11 by means of the vacuum suction pump 11a, and the final processed oil is discharged through the pipe 9 as previously described.

I claim:

1. In a centrifuge operating under vacuum for separating from a liquid certain substances which are more volatile than the liquid, the combination of a centrifugal rotor having a rotation axis and also having an inlet for the liquid and an outlet for centrifugally separated liquid, a housing surrounding the rotor and forming a chamber extending around the rotor and said axis for collecting liquid discharged through said outlet, a suction line leading from said collecting chamber for maintaining a partial vacuum therein, a discharge line leading from said collecting chamber for withdrawing liquid therefrom, said housing forming an outer wall of the collecting chamber located at a distance from said axis which is substantially greater than the radius of the rotor, and a heating device disposed around said outer wall.

2. The combination defined in claim 1, in which said housing extends downwardly to a level at least as low as the lower part of said rotor.

3. The combination defined in claim 1, comprising also means surrounding said outer wall and forming a second chamber surrounding said collecting chamber.

4. The combination defined in claim 1, comprising also means surrounding said outer wall and forming a second chamber surrounding said collecting chamber, said second chamber having an inlet for said liquid and communicating with said rotor inlet for supplying thereto liquid heated by said heating device.

5. The combination defined in claim 1, comprising also means surrounding said outer wall and forming a second chamber surrounding said collecting chamber, said heating device being disposed in said second chamber and including a series of electrical heating elements.

6. The combination defined in claim 1, comprising also means for maintaining a substantially constant liquid level in the collecting chamber, said rotor outlet being located above said liquid level, said level maintaining means including a first vertical pipe located in the collecting chamber and extending through the bottom thereof to said discharge line, said pipe being open at the top and provided with vertically spaced holes which decrease in area toward the bottom of the collecting chamber, and a second vertical pipe surrounding said first pipe with a clearance, said second pipe being open at both ends and extending from the vicinity of the bottom of said collecting chamber to the upper part of the collecting chamber above said liquid level.

7. The combination defined in claim 1, comprising also means forming a feed line leading to said rotor inlet and located in position to be heated by said heating device.

References Cited by the Examiner

UNITED STATES PATENTS

| 2,167,988 | 8/1939 | Mann | 233—21 |
| 2,542,456 | 2/1951 | Ayres | 233—19 |
| 2,550,502 | 4/1951 | Sittner | 233—11 XR |
| 2,921,969 | 1/1960 | Loy | 233—11 XR |

FOREIGN PATENTS

| 133,520 | 11/1951 | Sweden. |
| 130,752 | 11/1959 | U.S.S.R. |

M. CARY NELSON, *Primary Examiner.*

H. T. KLINKSIEK, *Assistant Examiner.*